(12) United States Patent
Farmer et al.

(10) Patent No.: US 9,673,478 B2
(45) Date of Patent: Jun. 6, 2017

(54) MULTI-LAYER COATINGS FOR BIPOLAR RECHARGEABLE BATTERIES WITH ENHANCED TERMINAL VOLTAGE

(75) Inventors: Joseph C. Farmer, Tracy, CA (US); James Kaschmitter, Pleasanton, CA (US); Steve Pierce, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 730 days.

(21) Appl. No.: 12/778,978

(22) Filed: May 12, 2010

(65) Prior Publication Data

US 2011/0281159 A1    Nov. 17, 2011

(51) Int. Cl.
*H01M 10/44* (2006.01)
*H01M 10/04* (2006.01)
*H01M 4/62* (2006.01)
*H01M 4/66* (2006.01)

(52) U.S. Cl.
CPC .......... *H01M 10/044* (2013.01); *H01M 4/62* (2013.01); *H01M 4/622* (2013.01); *H01M 4/661* (2013.01); *H01M 10/0418* (2013.01); *Y10T 29/49115* (2015.01)

(58) Field of Classification Search
CPC .. H01M 2300/0085; H01M 4/02; H01M 6/40; H01M 4/139; H01M 4/62; H01M 10/0565; H01M 10/617; H01M 4/485; H01M 4/505; H01M 4/525; H01M 10/0525; H01M 10/0562; H01M 2300/0094; H01M 4/131

USPC ......................................................... 429/210
See application file for complete search history.

(56) References Cited

U.S. PATENT DOCUMENTS

| 5,605,550 | A | 2/1997 | Jensen et al. | |
| 7,449,033 | B2 | 11/2008 | Ward et al. | 29/623.3 |
| 8,778,546 | B2 | 7/2014 | Farmer | |
| 2004/0161667 | A1* | 8/2004 | Fukuzawa et al. | 429/210 |

(Continued)

OTHER PUBLICATIONS

"Polymer Electrolytes for Lithium-Ion Batteries" Journal of Advanced Materials 10, No. 6 1998 to Meyer.*

(Continued)

*Primary Examiner* — Lucas J. O'Donnell
(74) *Attorney, Agent, or Firm* — Zilka-Kotab

(57) ABSTRACT

A method for producing a multi-layer bipolar coated cell according to one embodiment includes applying a first active cathode material above a substrate to form a first cathode; applying a first solid-phase ionically-conductive electrolyte material above the first cathode to form a first electrode separation layer; applying a first active anode material above the first electrode separation layer to form a first anode; applying an electrically conductive barrier layer above the first anode; applying a second active cathode material above the anode material to form a second cathode; applying a second solid-phase ionically-conductive electrolyte material above the second cathode to form a second electrode separation layer; applying a second active anode material above the second electrode separation layer to form a second anode; and applying a metal material above the second anode to form a metal coating section. In another embodiment, the anode is formed prior to the cathode. Cells are also disclosed.

36 Claims, 8 Drawing Sheets

(56) References Cited

U.S. PATENT DOCUMENTS

| | | | |
|---|---|---|---|
| 2005/0026037 A1* | 2/2005 | Riley et al. .................. | 429/210 |
| 2005/0132562 A1* | 6/2005 | Saito .................. | H01M 4/0404 |
| | | | 29/623.5 |
| 2005/0170255 A1* | 8/2005 | Koh et al. .................. | 429/316 |
| 2006/0036064 A1 | 2/2006 | McGrath et al. | |
| 2006/0063074 A1 | 3/2006 | Jenson et al. | |
| 2007/0190407 A1 | 8/2007 | Fujikawa et al. | |
| 2008/0286649 A1 | 11/2008 | Li et al. | |
| 2009/0239132 A1 | 9/2009 | Johnson | |
| 2009/0246636 A1* | 10/2009 | Chiang et al. ........... | 429/231.95 |
| 2010/0075225 A1* | 3/2010 | Wilkins .............. | H01M 4/0404 |
| | | | 429/212 |
| 2010/0291443 A1 | 11/2010 | Farmer | |
| 2010/0291444 A1 | 11/2010 | Farmer et al. | |

OTHER PUBLICATIONS

"An overview of the research and development of solid polymer electrolyte batteries" Electrochimica Acta 45 p. 1501-1508, 2000 to Murata et al.*

U.S. Appl. No. 12/778,975, filed May 12, 2010.

U.S. Appl. No. 12/778,967, filed May 12, 2010.

Non-Final Office Action from U.S. Appl. No. 12/778,975 dated Nov. 2, 2012.

Non-Final Office Action from U.S. Appl. No. 12/778,967 dated Nov. 6, 2012.

Restriction/Election Requirement from U.S. Appl. No. 12/778,975 dated Feb. 12, 2013.

Restriction/Election Requirement from U.S. Appl. No. 12/778,967 dated Aug. 29, 2012.

Restriction/Election Requirement from U.S. Appl. No. 12/778,975 dated Sep. 19, 2012.

Non-Final Office Action from U.S. Appl. No. 12/778,967 dated Jun. 7, 2013.

Notice of Allowance and Fee(s) Due from U.S. Appl. No. 12/778,967 dated Mar. 12, 2014.

Supplemental Notice of Allowance from U.S. Appl. No. 12/778,967, dated Jun. 12, 2014.

Final Office Action from U.S. Appl. No. 12/778,975, dated Mar. 20, 2013.

Fey et al., "Thermal and electrochemical behavior of yttria-stabilized zirconia coated $LiCoO_2$ during overcharge tests," Journal of Power Sources, vol. 189, Issue 1, Apr. 2009, pp. 837-840.

Hart et al., "Functionally graded composite cathodes for solid oxide fuel cells," Journal of Power Sources, vol. 106, Sep. 13, 2002, pp. 42-50.

* cited by examiner

MULTI-LAYER COATINGS FOR BIPOLAR RECHARGEABLE BATTERIES WITH ENHANCED TERMINAL VOLTAGE

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to rechargeable batteries, and more particularly, to systems and methods for multi-layer coatings for bipolar rechargeable batteries.

BACKGROUND

Electrochemical energy storage is currently used in many different portable applications, such as wireless communications and portable computing, just to name a few, and will be essential for the realization of future fleets of electric and hybrid electric vehicles, which are now believed to be an essential part of the world's strategy for reducing our dependence on oil and minimizing the impact of gaseous emissions of CO and $CO_2$ on climate change. In looking at possible materials that can be used for anodes in electrochemical energy conversion and storage systems, lithium appears to have one of the highest specific capacities, in terms of Ah/kg. See FIG. 1 which is a plot showing rankings of conventional anode materials. Hydrogen is typically used to power fuel cells, while lithium is typically used in advanced rechargeable battery cells and batteries.

Most currently used energy storage systems use lithium ion battery chemistry, with graphite anodes that intercalate lithium upon charging, mixed transition metal oxide cathodes that intercalate lithium during discharge, a microporous polyethylene electrode separator, and an electrolyte formed from a dielectric mixed solvent composed of organic carbonates, other solvents and high-mobility lithium salts. The movement of the lithium ions between the intercalation anodes and cathodes during charging and discharging is commonly known as the "rocking chair" mechanism.

Cells with liquid electrolytes are usually housed in cylindrical or prismatic metal cans, with stack pressure maintained by the walls of the can, while cells with polymer gel electrolytes are usually housed in soft-sided aluminum-laminate packages, with stack pressure achieved through thermal lamination of the electrodes and separators, thereby forming a monolithic structure.

Graphite powder is used as the active material for anodes, is coated onto thing copper foils that serve as current collectors for the anodes, and is held in place by a polyvinylidene fluoride (PVDF) binder. Transition metal oxide powder is used as the active material for cathodes, and is coated onto thin aluminum foils that serve as current collectors for the cathode, and is held in place by a PVDF binder. Both natural and manmade graphite, such as mesocarbon microbeads (MCMB), have been used for the anodes, while $Li_xCoO_2$, $Li_xNiO_2$, $Li_xMn_2O_4$, mixed transition metal oxides with cobalt, nickel, and manganese, and iron-phosphates, among others, are common choices for the cathode.

Over the past decade, these systems have attained outstanding specific energy and energy density, exceptional cycle life and rate capabilities that enable them to now be considered for both vehicular and power tool applications, in addition to their early applications in wireless communications and portable computing. The best commercially available, polymer-gel lithium ion battery now has a specific energy of greater than 180 Wh/kg, an energy density of greater than 360 Wh/L, and a reasonably good rate capability, allowing discharge over a broad range of C-rates.

Both liquid prismatic and polymer gel cells may be incorporated into large high-capacity power packs for electric vehicle and other applications. Such high capacity systems have state-of-the-art computerized charge and discharge control systems which include graphical user interfaces, and are capable of sensing for monitoring the health of individual cells, and balancing the charge of individual cells in large series-parallel arrays of cells.

Such lithium ion batteries, which rely on the rocking chair mechanism, are generally believed to be safer than those where lithium exists in the reduced metallic state. However, the use of flammable liquid-phase and two-phase polymer gel electrolytes, coupled with a high energy density, a relatively delicate about 20 micron thick polymeric separator, and the possibility of lithium plating and dendrite formation due to non-uniform stack pressure and electrode misalignment, has led to safety problems with these energy storage systems. One example of the type of unanticipated event with a lithium ion battery is evidenced by the rash of laptop battery fires experienced over recent years. The possibility of such an event occurring on commercial airliners, where many passengers carry laptop computers and cell phones with such batteries, is especially disconcerting. These events have occurred on much larger scales, and have caused industry-wide concern in the continued use of this important technology.

Adequate and intelligent thermal management in these cells is essential. High rates of charge or discharge drive the temperature upward due to resistive heating of the electrolyte. When the core temperature of these cells exceed a critical threshold (typically about 150° F.), the systems frequently become unstable, with the possible initiation of autocatalytic reactions, which can lead to thermal runaway and catastrophic results. Disproportionation of the transition metal oxides can liberate sufficient oxygen to support oxidation of the organic carbonate solvents used in the liquid or polymer-gel electrolytes. It is now recognized that while conventional systems provide high energy density, their safety remains problematic.

It would therefore be very beneficial to develop new battery materials and architectures that enhance the performance of rechargeable solid-state lithium-ion batteries, and that will provide high specific energy, high volumetric energy density, and high rate capability at high and/or low temperatures, e.g., about 0° C., with substantially improved safety and reliability through the elimination of combustible liquid organic solvents, to the greatest extent possible.

The battery industry has become extremely competitive, with lower prices placing pressure on battery manufacturers to optimize production processes, eliminating as many unnecessary production steps as possible. Great economic advantage could be achieved through reducing the number of steps involved in coating electrodes and fabricating separators, for example. Furthermore, it would be beneficial to construct cells in a bipolar architecture, further eliminating the weight and cost associated with electrode interconnects, with the possibility of a higher cell voltage than otherwise possible.

SUMMARY

A method for producing a multi-layer bipolar coated cell according to one embodiment includes applying a first active cathode material above a substrate to form a first cathode; applying a first solid-phase ionically-conductive electrolyte material above the first cathode to form a first electrode separation layer; applying a first active anode material above the first electrode separation layer to form a first anode; applying an electrically conductive barrier layer above the first anode; applying a second active cathode material above the barrier layer to form a second cathode; applying a second solid-phase ionically-conductive electrolyte material above the second cathode to form a second electrode separation layer; applying a second active anode material above the second electrode separation layer to form a second anode; and applying a metal material above the second anode to form a metal coating section.

A method for producing a multi-layer bipolar coated cell according to another embodiment includes applying a first active anode material above a substrate to form a first anode; applying a first solid-phase ionically-conductive electrolyte material above the first anode to form a first electrode separation layer; applying a first active cathode material above the first electrode separation layer to form a first cathode; applying an electrically conductive barrier layer above the first cathode; applying a second active anode material above the barrier layer to form a second anode; applying a second solid-phase ionically-conductive electrolyte material above the second anode to form a second electrode separation layer; applying a second active cathode material above the second electrode separation layer to form a second cathode; and applying a metal material above the second cathode to form a metal coating section.

A multi-layer bipolar coated cell formed on a single substrate according to one embodiment includes a first active cathode material positioned above a substrate; a first solid-phase electrolyte material positioned above the first active cathode material; a first active anode material positioned above the first solid-phase electrolyte material; a second active cathode material positioned above the first active anode material; a second solid-phase electrolyte material positioned above the second active cathode material; a second active anode material positioned above the second solid-phase electrolyte material; and a conductive material positioned above the second active anode material.

A multi-layer bipolar coated cell formed on a single substrate according to another embodiment includes a first active anode material positioned above a substrate; a first solid-phase electrolyte material positioned above the first active anode material; a first active cathode material positioned above the first solid-phase electrolyte material; a second active anode material positioned above the first active cathode material; a second solid-phase electrolyte material positioned above the second active anode material; a second active cathode material positioned above the second solid-phase electrolyte material; and a conductive material positioned above the second active cathode material.

Other aspects and embodiments of the present invention will become apparent from the following detailed description, which, when taken in conjunction with the drawings, illustrate by way of example the principles of the invention.

DETAILED DESCRIPTION

Figure 1:
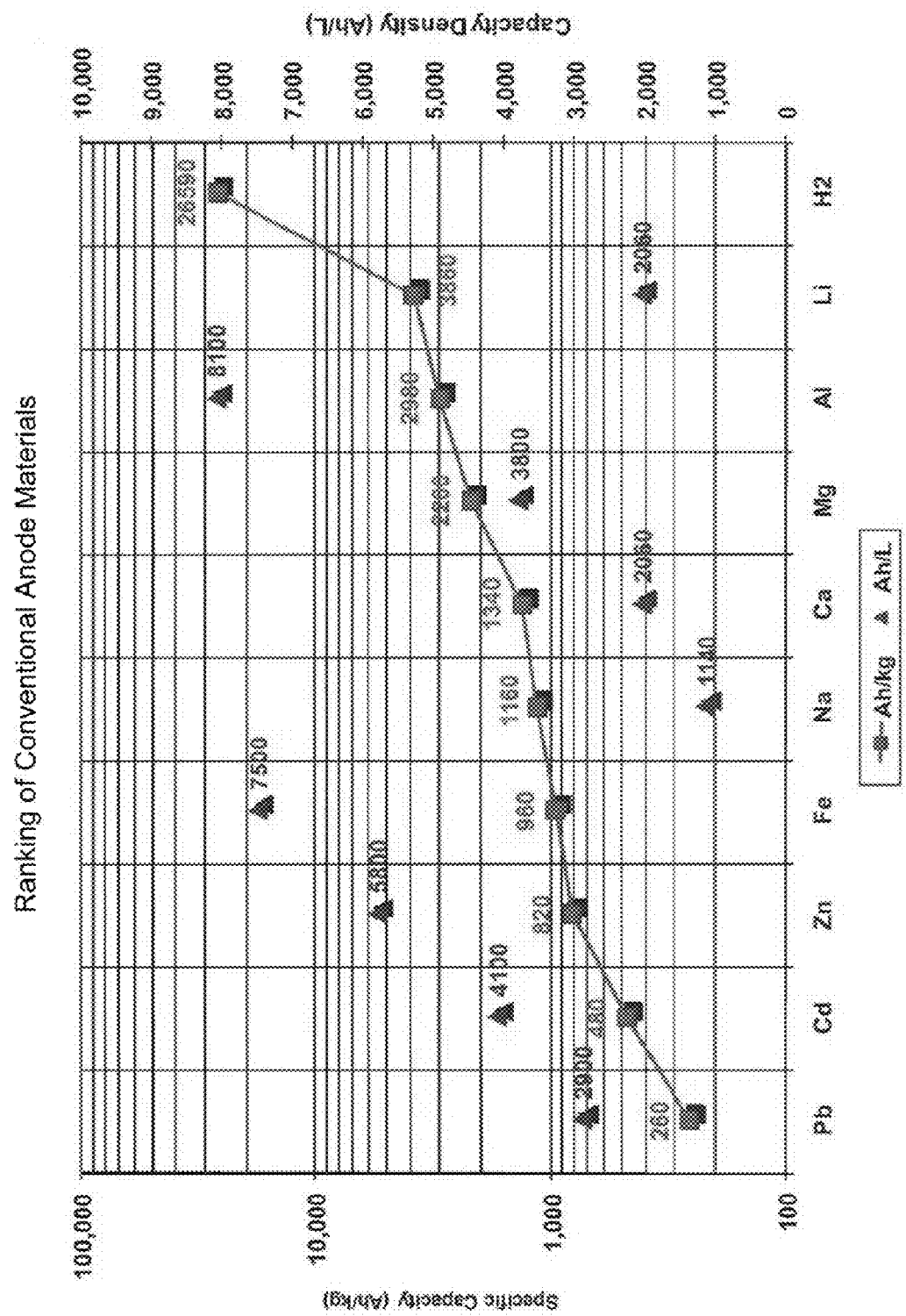
FIG. 1 is a plot showing range of pure materials that may be used as active materials in the anode layer or coating in a multilayer cell according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Most rechargeable lithium ion batteries are formed from (1) a cathode, made by coating an aluminum foil with a transition metal oxide active material, which is held in place with a PVDF binder; (2) an anode made by coating a copper foil with lithium-intercalated graphite material, also held in place with a PVDF binder; and (3) a micro-porous polyethylene separator, coated on both sides with porous layers of PVDF. These three materials are wound together to form the complete cell. Other packaging materials are also required.

Embodiments of the present invention include a novel multi-functional multi-layer coating process for fabrication of an entire cell on a single metal foil backing. For example, in one variation, the active cathode material is first applied to an aluminum foil or substrate, followed by application of a second coating that serves as a solid-phase electrolyte. After application of the electrolyte layer, the anode coating is applied, along with an electrically conductive over coat. The coating for the cathode and anode layers may be similar to those used in conventional lithium ion batteries, with the exception of the polymeric binder in some approaches, which in addition to PVDF, can also include ionically conductive polymers to facilitate lithium transport in the interstitial spaces of the electrodes. The electrode separation layer may be formed from particles of inorganic solid-state ion conductors (e.g., Li-ion conductors, Na-ion conductors, etc.), dispersed in a polymeric binder. The particles may be hard or not hard. In further approaches, the particles may be ceramic.

In one example, the preferred binder in the electrode separation layer is an ion exchange polymer, with high lithium ion mobility, or another polymeric electrolyte material appropriate for a conventional lithium ion battery such as a solid polymer electrolyte or a polymer-gel electrolyte. Note that polymer-gel electrolytes are preferred for use with anodes that involve the anodic oxidation of lithium with the formation of lithium ions, the anodic oxidation of sodium with the formation of sodium ions, and the like. The ion-conductive polymer may be a polymer with anionic sulfonate groups substituted onto a carbon-based backbone.

Embodiments of the present invention dramatically reduce production costs, by employing for example, a single multi-layer coating on a single foil backing substituted for two coated foils, and a coated polyethylene separator. Once fabricated, the multi-layer multi-functional coating can be used with conventional packaging materials. In addition to using this approach for the construction of lithium-based rechargeable, and primary batteries, it can also be applied to other battery chemistries, such as the nickel metal hydride system.

One embodiment begins with the anode current collector above the substrate, building from there. By repeating the anode current collector layer or coating/anode layer or coating/electrode separator layer or coating/cathode layer or coating/cathode current collector layer or coating sequence, a bipolar stack can be constructed, with a higher cell voltage than possible with a single-cell stack. If desired, a final impervious insulating coating can be applied over the entire stack to serve as the package. A much higher stack voltage can be achieved through this architecture than that involving jelly-roll and cut-and-stack configurations used in conventional cells.

In an alternate embodiment, the anode current collector (rather than the cathode current collector) is formed above the substrate. This embodiment may begin with the cathode current collector on the substrate, building from there. By repeating the cathode current collector layer or coating/cathode layer or coating/electrode separator layer or coating/anode layer or coating/anode current collector layer or coating sequence, a bipolar stack can be constructed, with a higher cell voltage than possible with a single-cell stack. If desired, a final impervious insulating coating can be applied over the entire stack to serve as the package.

In one general embodiment, a method for producing a multi-layer bipolar coated cell includes applying a first active cathode material above a substrate to form a first cathode, applying a first solid-phase electrolyte material above the first cathode to form a first electrode separation layer, applying a first active anode material above the first electrode separation layer to form a first anode, applying a first metal interconnect material above the first anode to form a first metal interconnect coating section, applying a second active cathode material above the first metal interconnect coating section to form a second cathode, applying a second solid-phase electrolyte material above the second cathode to form a second electrode separation layer, applying a second active anode material above the second electrode separation layer to form a second anode, and applying a second metal interconnect material above the second anode to form a second metal interconnect coating section.

In another general embodiment, a method for producing a multi-layer bipolar coated cell includes applying a first active anode material above a substrate to form a first anode, applying a first solid-phase electrolyte material above the first anode to form a first electrode separation layer, applying a first active cathode material above the first electrode separation layer to form a first cathode, applying a second active anode material above the first active cathode material to form a second anode, applying a second solid-phase electrolyte material above the second anode to form a second electrode separation layer, applying a second active cathode material above the second electrode separation layer to form a second cathode, and applying a metal material above the second cathode to form a metal coating section.

In another general embodiment, a multi-layer bipolar coated cell formed on a single substrate includes a first active cathode material positioned adjacent to a substrate, a first solid-phase electrolyte material positioned adjacent to the first active cathode material, a first active anode material positioned adjacent to the first solid-phase electrolyte material, a first metal interconnect material positioned adjacent to the first active anode material, a second active cathode material positioned adjacent to the first metal interconnect material, a second solid-phase electrolyte material positioned adjacent to the second active cathode material, a second active anode material positioned adjacent to the second solid-phase electrolyte material, and a second metal interconnect material positioned adjacent to the second active anode material.

In another general embodiment, a multi-layer bipolar coated cell termed on a single substrate includes a first active anode material positioned above a substrate, a first solid-phase electrolyte material positioned above the first active anode material, a first active cathode material positioned above the first solid-phase electrolyte material, a second active anode material positioned above the first active cathode material, a second solid-phase electrolyte material positioned above the second active anode material, a second active cathode material positioned above the second solid-phase electrolyte material, and a conductive material positioned above the second active cathode material.

Figure 2:
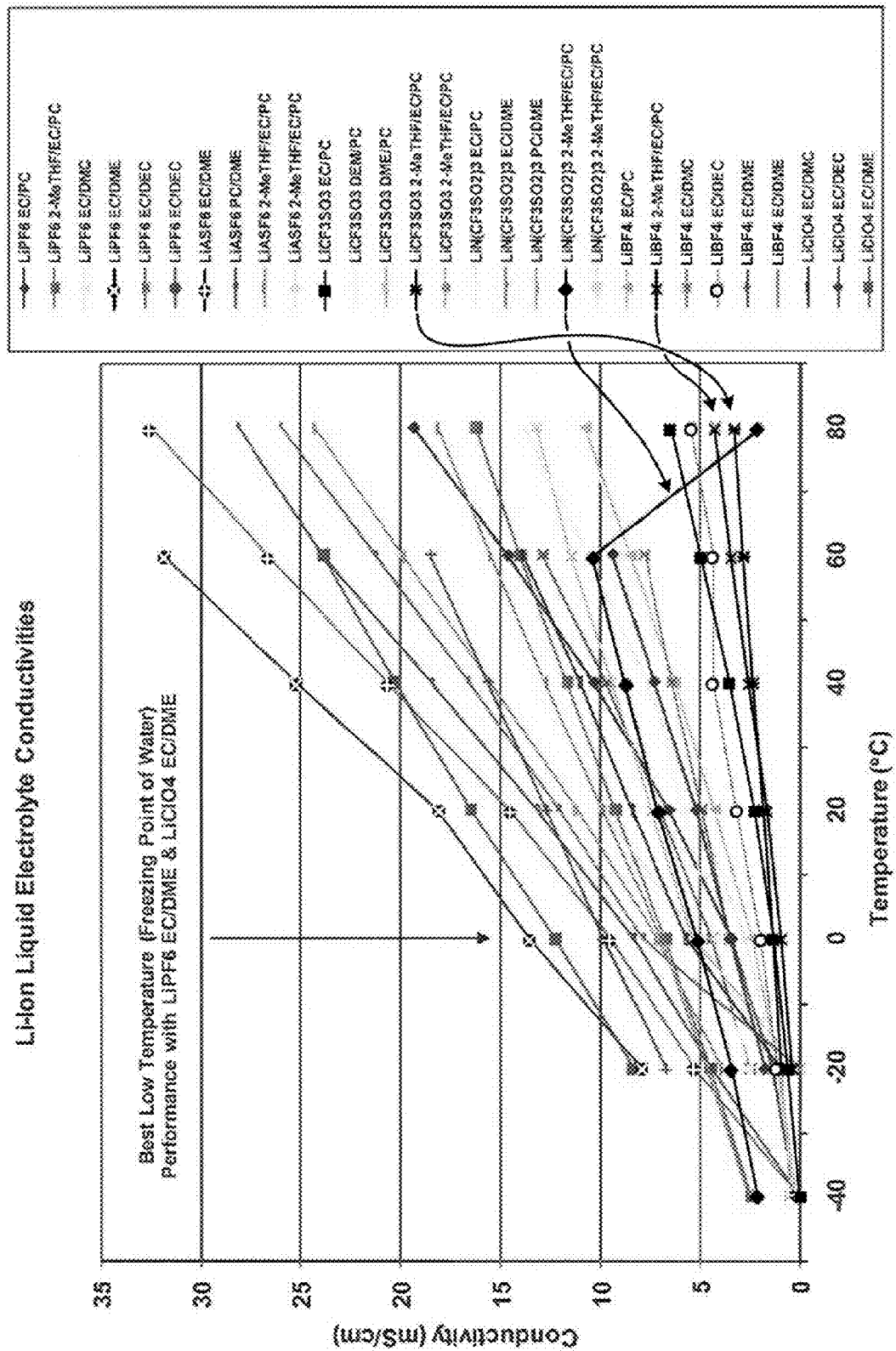
FIG. 2 shows a plot of Li-ion liquid electrolyte conductivities, that establish targeted conductivities for electrode separation layer or coating in the multi-layer cell.

Solid-state electrolyte systems with exceptionally high mobility, according to one embodiment, may be developed that are mechanically robust, thermochemically stabile, and inherently safe. These new electrolytes may involve organic solid-polymer electrolytes, and may enable the construction of cells with an electrolyte/separator thickness of preferably less than about 25 microns, and electrolyte conductivity preferably greater than about 15 mS/cm at 0° C. This level of lithium ion mobility in a solid material is greater than that observed with the best liquid electrolytes, some of which are shown in FIG. 2. The best currently available materials have an order-of-magnitude lower conductivity, and lack stability in contact with the cathode, which exists at a high anodic (oxidizing) potential. These advanced solid-state high-mobility ion conductor materials may enable the construction of inherently safe, high-rate, high-capacity solid-state lithium cells, in some preferred embodiments. Substitution, inorganic constituents, and/or radiation cross-linking may be employed, as desired.

These new solid-state fast ion conductors may serve not only as solid-state electrolytes, but also as binders for the active materials used for holding the anode and cathode materials to their respective current collectors. In one embodiment, by incorporating hard powders of inorganic ion-conductive materials into the polymeric material, a robust composite separator material may be formed between the two electrodes, with enhanced mobility and resistance to shorting. A graded composite is possible, where inorganic particles in the polymer matrix transition from transition metal oxides at the cathode interface, to ion-conductive particles in the separator region, to graphitic particles at the anode interface, according to preferred approaches.

Advanced anode materials, according to some embodiments, may be developed to provide a specific capacity of about 750 Ah/kg, and a capacity density of about 1700 Ah/L, in some approaches, which exceeds the performance of currently available and known materials. For comparison purposes, intercalated graphite ($Li_xC_6$) is the industry standard for the active material used to fabricate anodes in lithium-ion battery cells, and has a theoretical specific capacity of 372 Ah/kg, and a theoretical capacity density of 837 Ah/L (the practical values are lower than these theoretical values). The advanced anode materials, in some embodiments, exceed the theoretical values for the industry standard materials by a factor of at least two.

Advanced cathode materials, according to some embodiments, may be developed to provide a specific capacity of up to about 550 Ah/kg, and a capacity density of up to about 2040 Ah/L. For comparison purposes, lithium cobalt oxide ($Li_xCoO_2$) is the industry standard for the active material used to fabricate cathodes in lithium-ion battery cells, and has a theoretical specific capacity of 274 Ah/kg, and a theoretical capacity density of 1017 Ah/L (the practical values are lower than these theoretical values). The advanced cathode materials, in some approaches, exceed the theoretical values for the industry standard materials, once again, by a factor of two.

In addition to conventional electrode materials, novel materials and structures have been explored. Explored materials include: Si and $CoO_2$ nanowires; titanates; nano-structural metal foam electrodes with electrodeposited or sputtered lithium, and ion conductive polymer infiltration; and non-stoichiometric oxide fillers with metal-like electrical conduction. These solid state ion-conductive materials may be designed with the help of models founded in statistical mechanics and molecular dynamics. The attributes of the molecular structure that impact ion mobility include: (1) the specific cation exchange group substituted onto the polymer backbone, (2) the distance between adjacent cation exchange groups, (3) the impact of other substituent groups on ion mobility, (4) the impact of cross-linking, and (5) the effects of temperature and potential. The thermochemical stability of solid electrolyte systems using these materials may be explored with differential scanning calorimetry, as well as with computational codes such as THERMOCALC.

Ultimately, an inherently safe, high-energy, high-rate solid-state rechargeable battery may be fabricated as a composite solid-state material, in some approaches. Advancements made through material science enables the construction of a solid-state rechargeable battery that may have a specific capacity of at least about 360 Ah/kg and a volumetric capacity density of at least about 700 AW/L. The best currently commercially available lithium ion battery now has a specific energy of about 180 Wh/kg, an energy density of about 350 Wh/L, and a reasonably good rate capability, allowing discharge at C/2. A typical solid polymer electrolyte (SPE) cell has a specific energy of only about 100 Wh/kg, and an energy density of only about 80 Wh/L (though some higher values have been reported). These advancements allow for the first robust solid-state rechargeable battery to be brought to market.

In addition to the solid state electrolytes shown in FIG. 2, other well known solid state electrolytes may be used, and some are shown in Table 1, below.

TABLE 1

Examples of Solid State Electrolytes

| Dates | Electrolyte | $\sigma$ (S m$^{-1}$) | Cell System | Capacity Density (Ah/L) | Energy Density (Wh/L) |
|---|---|---|---|---|---|
| 1950-1960 | AgI | $10^{-3}$ | $Ag/V_2O_5$ | | |
| 1960-1965 | $Ag_3SI$ | 1 | $Ag/I_2$ | 750 | 510 |
| 1965-1972 | $RbAg_4I_5$ | 30 | $Ag/Me_4NI_5$ | | |
| 1965-1975 | $\beta$-$(Al_2O_3)_{11}(Na_2O)_1$ | 3 | $Na$—$Hg/I_2(PC)$ | 540 | 1600 |
| 1970-1975 | $LiI(Al_2O_3)$ | $10^{-3}$ | $Li/PbI_2$ | | |
| 1970-1980 | LiI | $10^{-5}$ | $Li/I_2(P2VP)$ | 690 | 1900 |
| 1978-1985 | LiX-PEO | $10^{-5}$ | $Li/V_2O_5$ | | |
| 1980-1986 | $Li_{0.36}I_{0.14}O_{0.007}P_{0.11}S_{0.38}$ | $5 \times 10^{-2}$ | $Li/TiS_2$ | | |
| 1983-1987 | MEEP | $10^{-2}$ | $Li/TiS_2$ | | |
| 1985-1992 | Plasticized SPE | $10^{-1}$ | $Li/V_6O_{13}$ | | |
| 1985-1992 | $Li_{0.35}I_{0.12}O_{0.31}P_{0.12}S_{0.098}$ | $2 \times 10^{-3}$ | $Li/TiS_2$ | | |
| 1990-1992 | $Li_{0.39}N_{0.02}O_{0.47}P_{0.12}$ | $3 \times 10^{-4}$ | $Li/V_2O_5$ | | |

Figure 3:
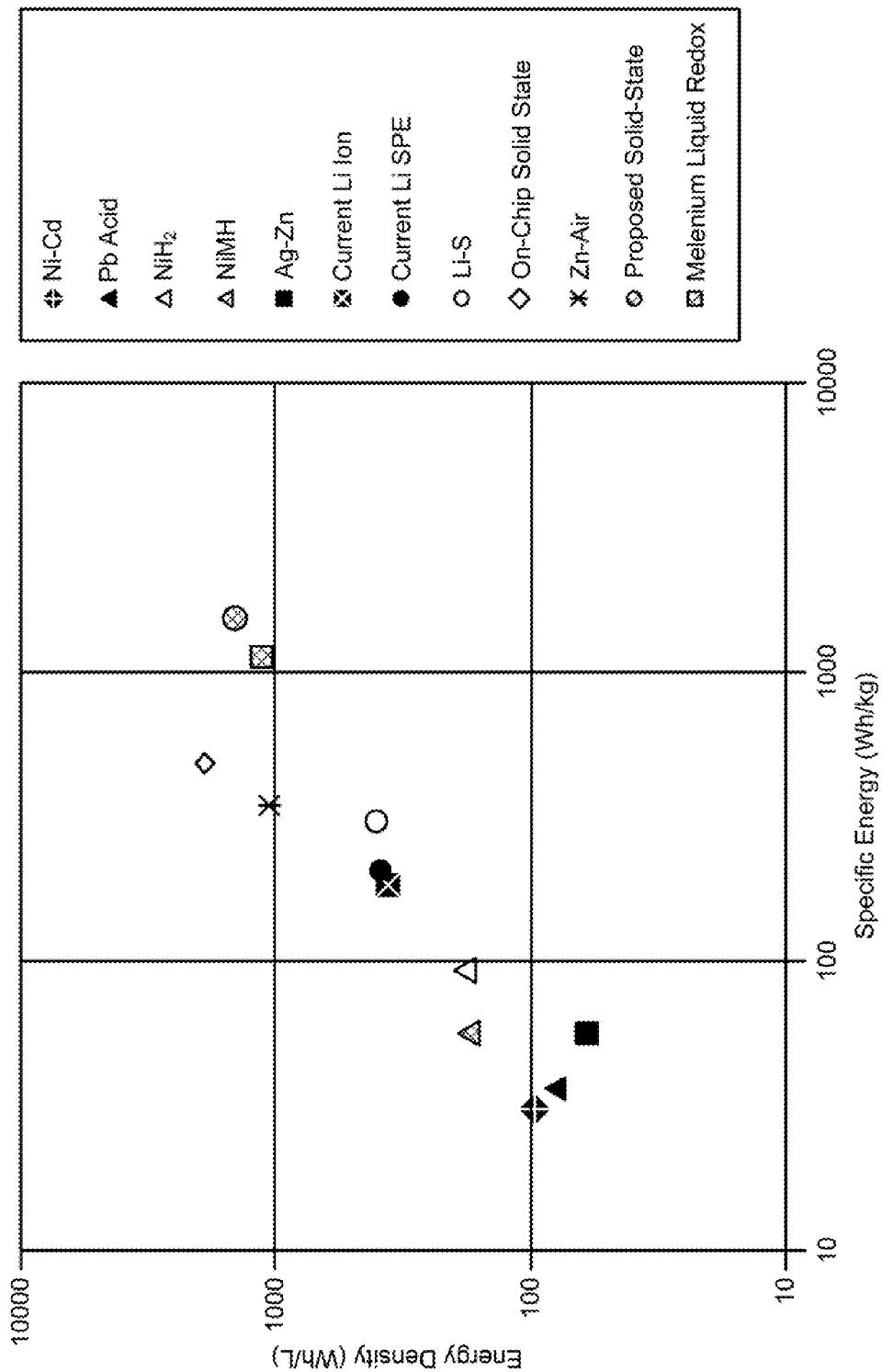
FIG. 3 shows a plot comparing energy storage technologies, with improvements possible with new multilayer cells according to some embodiments.

Several illustrative possibilities are summarized in FIG. 3, which is a comparison plot of energy storage technologies. The plot clearly shows that the cells and batteries disclosed herein, according to multiple embodiments, provide the highest combination of specific energy and energy density, as desired by the field.

Figure 4:
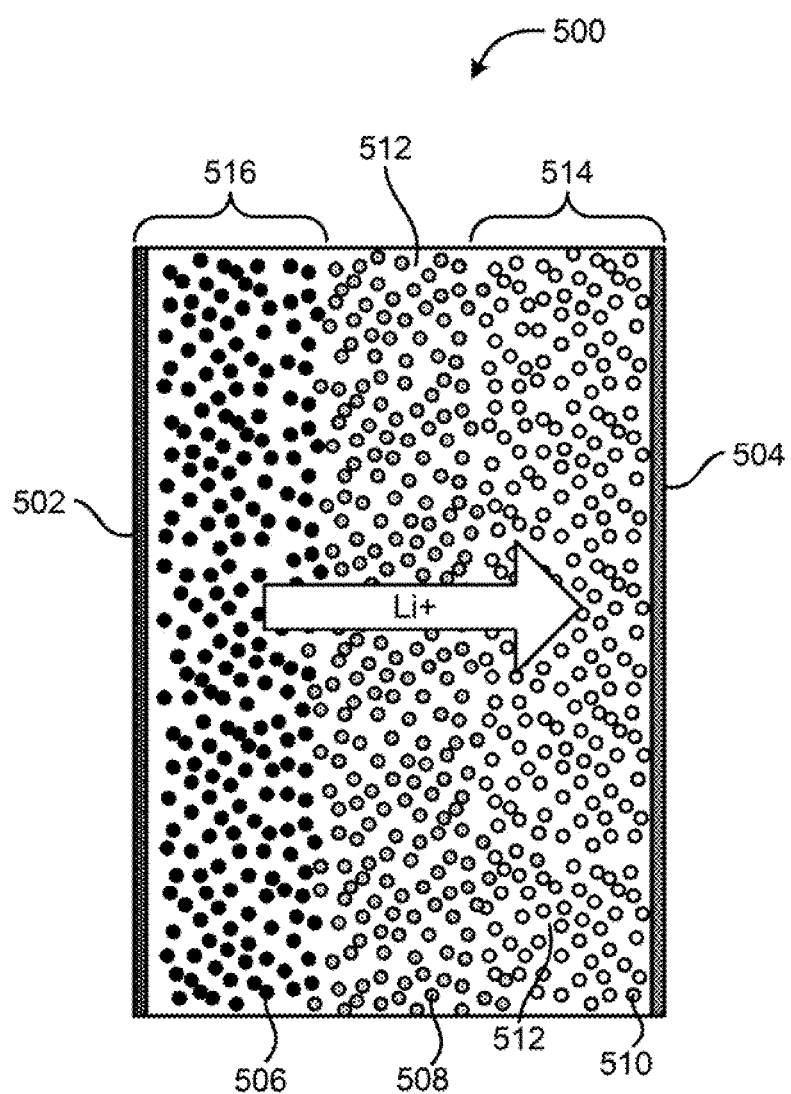
FIG. 4 shows a simplified schematic diagram of a multilayer cell, according to one embodiment.

In some embodiments of the present invention, rechargeable lithium ion batteries are formed from a cathode (typically made by coating, e.g., an aluminum foil, with a transition metal oxide active material, which may be held in place, e.g., with a polyvinylidene fluoride (PVDF) binder), an anode (typically made by coating, e.g., a copper foil with lithium-intercalated graphite material, also possibly held in place, e.g., with a PVDF binder), and a micro-porous, e.g., polyethylene separator (typically coated on both sides with porous layers of, e.g., PVDF). These three materials are typically wound together to form the complete cell. Other packaging materials are also used as required and/or desired. A conceptual drawing of such a multi-layer multi-functional cell is shown in FIG. 4, according to one embodiment.

The cell 500 may be a lithium ion cell formed on a single substrate 502 or 504. For the present discussion, the substrate is assumed to be 504. In some approaches, the substrate 504 may be a chemically compatible metal foil, as would be known to one of skill in the art, such as a copper foil, aluminum foil, etc. depending on the active material adjacent to the foil. The cell 500 comprises an active cathode material 510, such as $Li_xC_6$, etc., positioned adjacent to the substrate 504, a solid-phase electrolyte material 508 positioned adjacent to the active cathode material 510, an anode material 506, such as $Li_x(Ni$—$CoMn)O_2$, etc., positioned adjacent to the solid-phase electrolyte material 508, and an electrically conductive overcoat material 502 positioned adjacent to the anode material 506. The electrically conductive overcoat material 502 may be a metal foil, in some approaches, such as a copper foil, aluminum foil, etc. depending on the active material adjacent to the foil.

According to one embodiment, the active cathode material 510 and the anode material 506 may comprise an ionically conductive polymer 512 to facilitate lithium transport in interstitial spaces of a cathode 514 and an anode 516, respectively. In further approaches, the ionically conductive polymer 512 may comprise a polymer with anionic sulfonate groups substituted onto a carbon-based backbone. In more approaches, the polymer 512 may comprise PVDF with or without an ionically conductive material, a polymer with anionic sulfonate groups substituted onto a carbon-based backbone, etc.

In another approach, the solid-phase electrolyte material 508 may comprise particles of inorganic solid-state lithium ion conductors dispersed in a polymeric binder 512, the binder 512 being an ion exchange polymer with high lithium mobility, another polymeric electrolyte material, etc. According to a further approach, the ion exchange polymer may comprise a polymer with anionic sulfonate groups substituted onto a carbon-based backbone.

For example, in one variation, the active cathode material is first applied to an aluminum foil or substrate, followed by application of a second coating that serves as a solid-phase electrolyte. After application of the electrolyte layer, the anode coating is applied, along with an electrically conductive over coat. By repeating this process several limes, a multilayer coating can be used to fabricate a bipolar cell on a single metal substrate backing.

This multilayer coating process for bipolar cell configurations promises inexpensive, high-performance bipolar batteries with relatively high terminal voltages, in some approaches, which may be used in some conventional and almost all conceivable future electric vehicle (EV) and hybrid electric vehicle (HEV) applications. For example, a single cell coating with the multilayer multi-functional coating process of FIG. 4 is capable of making a single lithium ion cell, with a terminal voltage of about 4.1V to about 4.2V at 100% state-of-charge (SOC), whereas a multilayer cell with a bipolar stack configuration could produce a terminal voltage of about 12V, 24V, 100V, or even higher. A final cap layer could serve as a hermetic envelope encapsulating and protecting the active material in the cells.

Figure 5A:
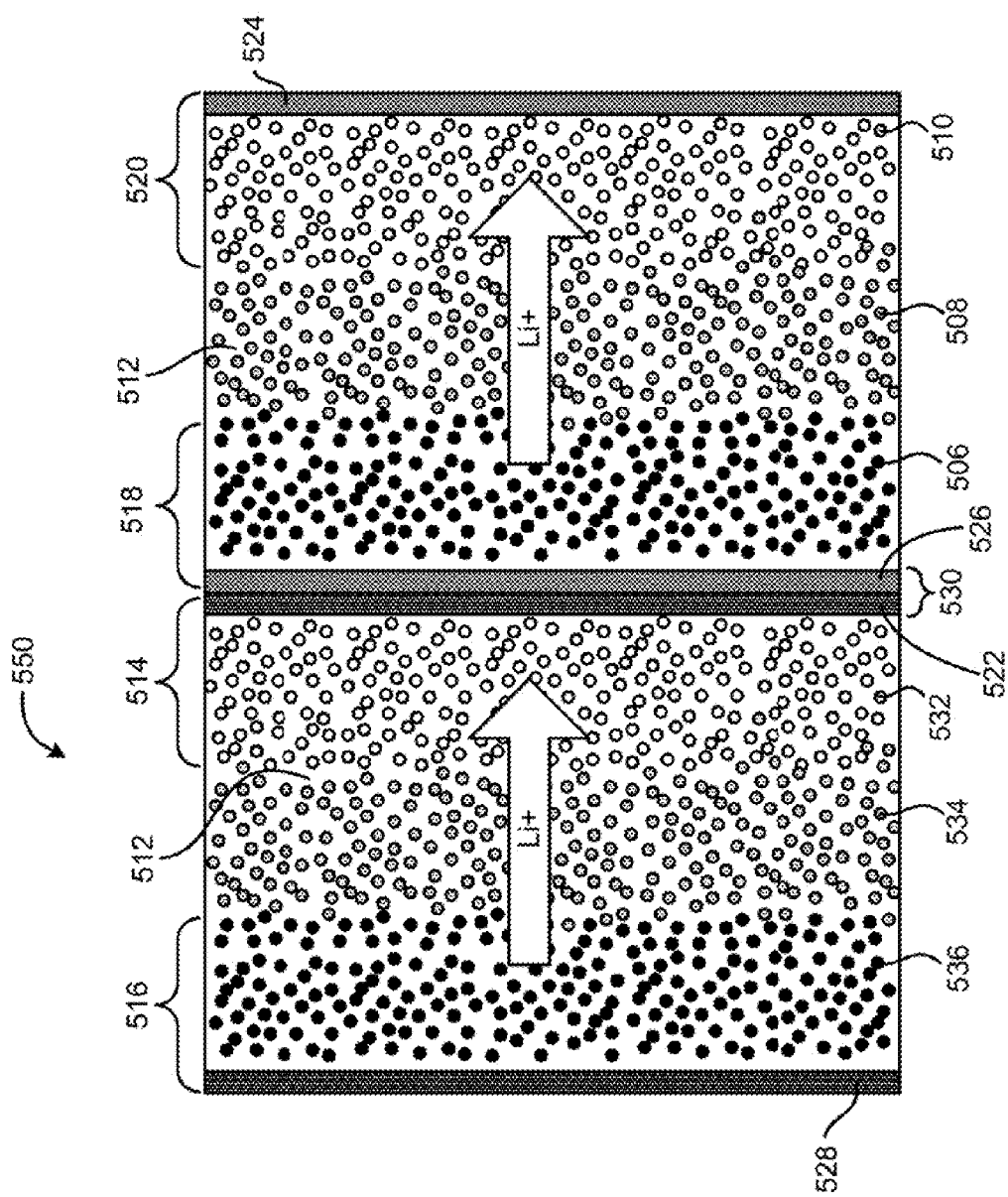
FIG. 5A shows a simplified schematic diagram of a bipolar cell, according to one embodiment.

Now referring to FIG. 5A, a multilayer bipolar cell 550 is shown according to one embodiment. The bipolar cell 550 may be two or more lithium ion cells formed on a single substrate 524. In some approaches, the substrate 524 may be a metal foil, of a type known to one of skill in the art, such as a copper foil, an aluminum foil, etc. depending on the active material adjacent to the foil. Moreover, the substrate 524, which is shown associated with cathode 520, may be associated with an anode 516. In a preferable embodiment, the substrate 524 may be an aluminum foil. The cell 550, in the embodiment shown, comprises a first active cathode material 510 positioned adjacent to the substrate 524, a first solid-phase electrolyte material 508 positioned adjacent to the first active cathode material 510, a first active anode material 506 positioned adjacent to the first solid-phase electrolyte material 508, and a first metal interconnect coating section 526 positioned adjacent to the first active anode material 506. The first metal interconnect coating section, which acts as an electrically conductive barrier layer 530, may be comprised of one or more metal foils, in some approaches, such as a copper foil, aluminum foil, etc. depending on the active material adjacent to the foil, one or more layers of metal particles, etc. As shown in FIG. 5A, the first metal interconnect coating section 530 may include two metal layers, an aluminum layer 526 and a copper layer 522, according to one embodiment. In other embodiments, these layers may be comprised of other metals, of a type known in the art to provide a barrier to $Li^+$ while serving as an electrical conductor. The bipolar cell 550 also includes a second active cathode material 532 positioned adjacent to the first metal interconnect coating section 530, a second solid-phase electrolyte material 534 positioned adjacent to the second active cathode material 532, a second active anode material 536 positioned adjacent to the second solid-phase electrolyte material 534, and a second metal coating section 528 positioned adjacent to the second active anode material 536. The second metal coating section 528 may be comprised of one or more metal foils, in some approaches, such as a copper foil, aluminum foil, etc. depending on the active material adjacent to the foil. In a preferable embodiment, the second metal coating section 528 may be comprised of copper foil. Also, additional layers of materials may be added to form a series of cells having any desired amount of cells.

In this and other embodiments of the present invention, active materials in the anode layer or coating may include the pure solid-phase elements shown in FIG. 1 (Pb, Cd, Zn, Fe, Na, Ca, Mg, Al, and Li). Moreover, active materials in the anode layer or coating may include alloys formed from the pure solid-phase elements shown in FIG. 1 (Pb, Cd, Zn, Fe, Na, Ca, Mg, Al, and Li). Active materials in the anode layer or coating of cells with lithium-ion type chemistry may include Li—Si alloys, Li—Sn alloys, Li-intercalated and synthetic graphites; and lithium titanates. Active materials in the anode layer or coating of cells with sodium-ion type chemistry may include various alloys of Na, as well as intercalation compounds of Na. Anode materials in the anode layer or coating of cells with NiMH or other hydride chemistries may include any of the hydrides shown in FIG. 7, with the addition of hydrides that include palladium, tantalum and/or zirconium.

In this and other embodiments of the present invention, active materials in the cathode layer or coating of cells with lithium-ion type chemistry may include: cobalt, nickel and manganese transition metals, such as $Li_xCoO_2$, $Li_xNiO_2$, $Li_xMn_2O_4$, and $Li_x(Co,Ni,Mn)O_2$; iron phosphates; and other appropriate intercalation compounds or alloys of lithium. In the case of NiMH or other metal-hydride-type chemistries, the cathode layer or coating may include various metals and alloys According to one embodiment, the first and second active cathode materials 510, 532 and the first and second active anode material s 506, 536 may comprise an ionically conductive polymer 512 to facilitate lithium transport in interstitial spaces of cathodes 514, 520 and anodes 516, 518 thereof, respectively. In further approaches, the ionically conductive polymer 512 may comprise a polymer with anionic sulfonate groups substituted onto a carbon-based backbone. In more approaches, the polymer 512 may comprise, with or without an ionically conductive material, a polymer with anionic sulfonate groups substituted onto a carbon-based backbone, etc.

In another approach, the first and second solid-phase electrolyte materials 508, 534 may comprise particles of inorganic solid-state lithium ion conductors dispersed in a polymeric binder 512, the binder 512 being an ion exchange polymer with high lithium mobility, another polymeric electrolyte material, etc. According to a further approach, the ion exchange polymer may comprise a polymer with anionic sulfonate groups substituted onto a carbon-based backbone.

The order of formation is not critical, i.e., the cathode or anode side may be formed first. Thus, for example, the cell of FIG. 5A may be created by forming layers from right to left as shown in the FIG., or left to right. This is true for other embodiments of the present invention.

Figure 5B:
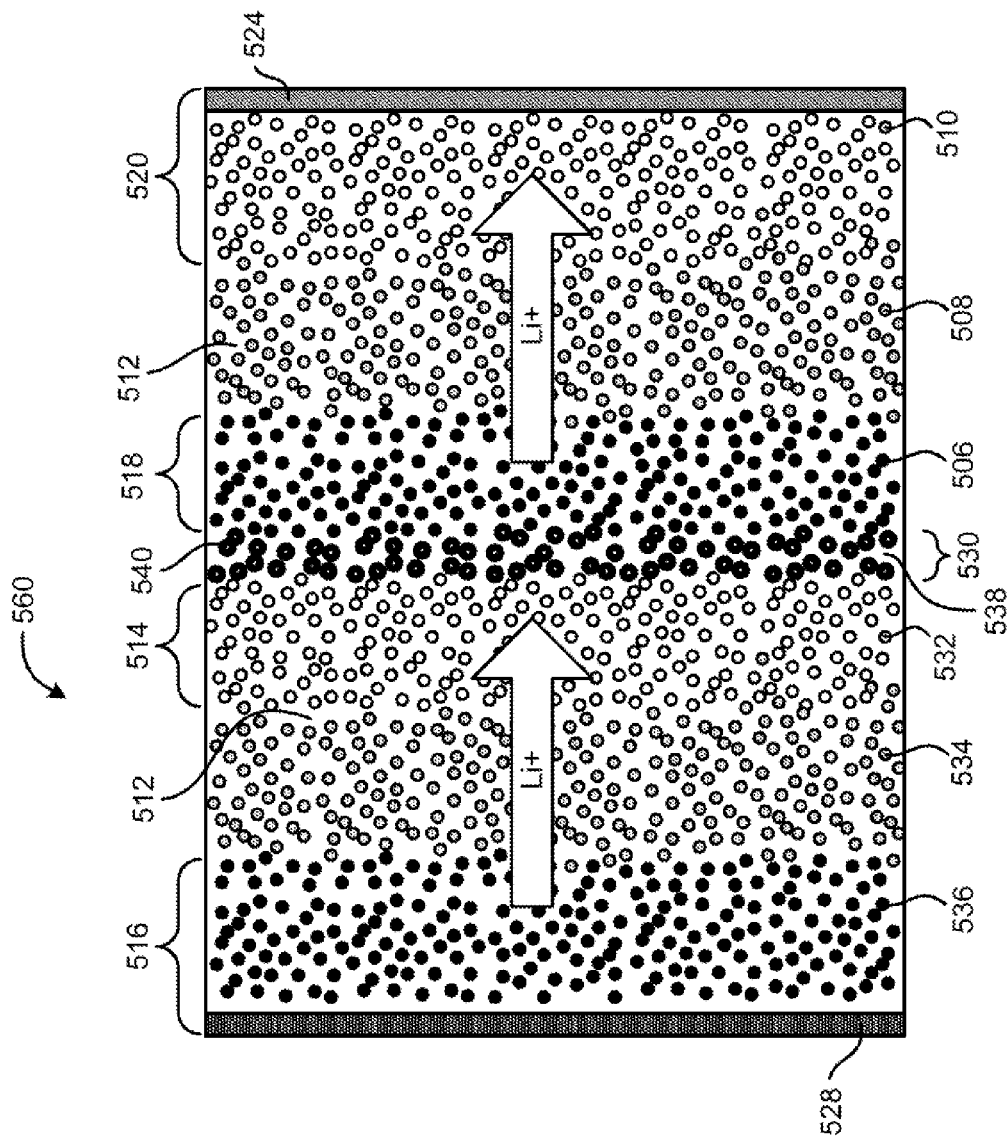
FIG. 5B shows a simplified schematic diagram of a bipolar cell, according to one embodiment.

In FIG. 5B, an alternate embodiment is shown where a metal coating section is replaced with a composite coating, with metallic or other electrically conductive particles 540 held in place by a polymer 538, which may be electrically conductive (in contrast to ionically conductive). As shown, a multilayer bipolar cell 560 according to one embodiment includes two or more lithium ion cells formed on a single substrate 524. In some approaches, the substrate 524 may be a metal foil, of a type known to one of skill in the art, such as a copper foil, an aluminum foil, etc. depending on the active material adjacent to the foil. Moreover, the substrate 524, which is shown associated with cathode 520, may be associated with an anode 516. In a preferable embodiment, the substrate 524 may be an aluminum foil. The cell 560, in the embodiment shown, comprises a first active cathode material 510 positioned adjacent to the substrate 524, a first solid-phase electrolyte material 508 positioned adjacent to the first active cathode material 510, a first active anode material 506 positioned adjacent to the first solid-phase electrolyte material 508, a second active cathode material 532 separated from the first active anode material 506 by an electrically conductive barrier layer 530, a second solid-phase electrolyte material 534 positioned adjacent to the second active cathode material 532, a second active anode material 536 positioned adjacent to the second solid-phase electrolyte material 534, and a metal coating section 528 positioned adjacent to the second active anode material 536. The second metal coating section 528 may be comprised of one or more metal foils, in some approaches, such as a copper foil, aluminum foil, etc. depending on the active material adjacent to the foil. In a preferable embodiment, the second metal coating section 528 may be comprised of copper foil. Also, additional layers of materials may be added to form a series of cells having any desired amount of cells.

In some approaches, more than two cells, e.g., 3, 4, 5, 10, 25, etc., may be formed end-to-end such that the multilayer multi-polar cell is capable of producing even more energy.

Figure 6:
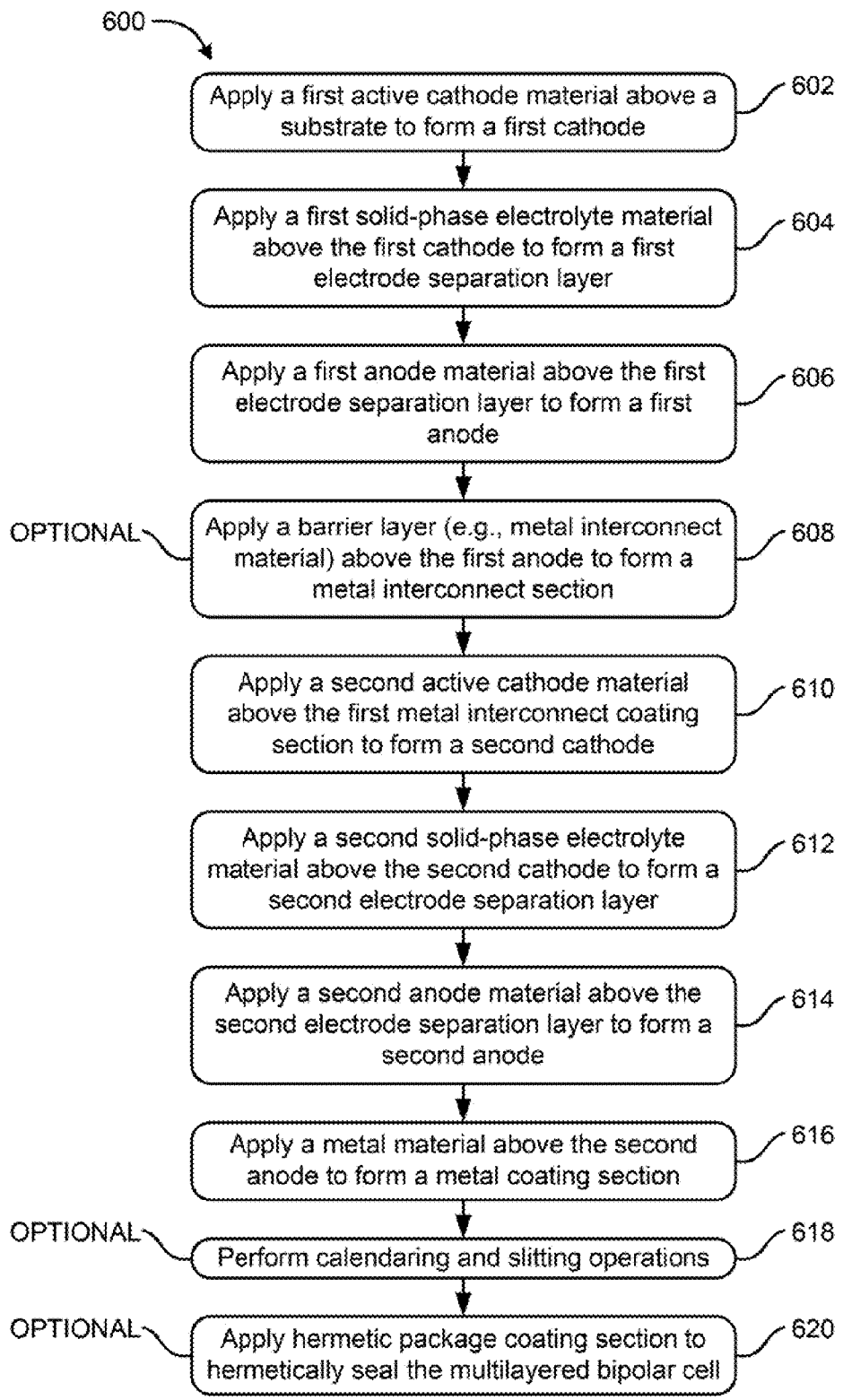
FIG. 6 shows a flow chart of a method, according to one embodiment.

Now referring to FIG. 6, a method 600 for producing a multi-layer bipolar coated cell is shown according to one embodiment. This method 600 may be carried out in any desired environment, and may be applied to production of various types of cells, including lithium ion cells, nickel metal hydride (NiMH) cells, proton exchange membrane (PEM) fuel cells, etc. Moreover, while the cathode is described as being formed first, one skilled in the art will appreciate that the operations described below may be rearranged with slight or no modification to form the anode side first.

In operation 602, a first active cathode material is applied above a substrate to form a first cathode. Any method of application may be used, including, but not limited to, slurry coating with doctor blade to control thickness, sputter coating, chemical vapor deposition (CVD), plasma-enhanced chemical vapor deposition (PECVD), physical vapor deposition (PVD), ion plating, electroplating, electroless plating, sol-gel deposition, spraying, dip-coating, etc.

In one approach, the substrate may comprise a metal foil. Any suitable metal foil as would be known to one of skill in the art may be used, such as metal foils capable of being used in a cell of a lithium ion battery, a copper foil, an aluminum foil, etc. depending on the active material adjacent to the foil.

In one approach, the first active cathode material may comprise an ionically conductive polymer to facilitate lithium transport in interstitial spaces of the cathode. In addition, the ionically conductive polymer may comprise a polymer with anionic sulfonate groups substituted onto a carbon-based backbone. In another approach, the polymer may comprise PVDF, alone or in combination with a polymer with anionic sulfonate groups substituted onto a carbon-based backbone.

In operation 604, a first solid-phase electrolyte material is applied above the first cathode to form a first electrode separation layer. Any method of application may be used, including, but not limited to, slurry coating with doctor blade to control thickness, sputter coating, CVD, PECVD, PVD, ion plating, electroplating, electroless plating, sol-gel deposition, spraying, dip-coating, etc.

According to one approach, the first solid-phase electrolyte material may comprise particles of inorganic solid-state lithium ion conductors dispersed in a polymeric binder. The binder may be an ion exchange polymer with high lithium mobility, another polymeric electrolyte material, etc. In a further approach, the ion exchange polymer may comprise a polymer with anionic sulfonate groups substituted onto a carbon-based backbone.

In operation 606, a first active anode material is applied above the first electrode separation layer to form a first anode. Any method of application may be used, including, but not limited to, slurry coating with doctor blade to control thickness, sputter coating, CVD, PECVD, PVD, ion plating, electroplating, electroless plating, sol-gel deposition, spraying, dip-coating, etc.

In one approach, the first active anode material may comprise an ionically conductive polymer to facilitate lithium transport in interstitial spaces of the first anode. In addition, the ionically conductive polymer may comprise a polymer with anionic sulfonate groups substituted onto a carbon-based backbone. In another approach, the polymer may comprise PVDF, alone or in combination with an ionically conductive material, a polymer with anionic sulfonate groups substituted onto a carbon-based backbone, etc.

In optional operation 608, an electrically conductive barrier layer, such as a first metal interconnect material, is applied above the first anode to form a first metal interconnect coating section. Any material suitable to be used as an interconnect may be used as would be known to one of skill in the art, such as aluminum, copper, silver, gold, etc. depending upon the active material adjacent to those metals. In one approach, the first metal interconnect coating section may comprise one or more metal foils or metal particles. Any suitable metal foil as would be known to one of skill in the art may be used, such as metal foils capable of being used in a cell of a lithium ion battery, a copper foil, an aluminum foil, etc. depending on the active material adjacent to the foil. The electrically conductive barrier layer may also include conductive particles in a binder of a type disclosed herein, e.g., PVDF, electrically conductive binder, etc. Also, any method of application may be used, including, but not limited to, slurry coating with doctor blade to control thickness, sputter coating, CVD, PECVD, PVD, ion plating, electroplating, electroless plating, sol-gel deposition, spraying, dip-coating, etc.

In operation 610, a second active cathode material is applied above the first metal interconnect coating section to form a second cathode. Any method of application may be used, including, but not limited to, slurry coating with doctor blade to control thickness, sputter coating, chemical vapor deposition (CVD), plasma-enhanced chemical vapor deposition (PECVD), physical vapor deposition (PVD), ion plating, electroplating, electroless plating, sol-gel deposition, spraying, dip-coating, etc.

In one approach, the second active cathode material may comprise an ionically conductive polymer to facilitate lithium transport in interstitial spaces of the cathode. In addition, the ionically conductive polymer may comprise a polymer with anionic sulfonate groups substituted onto a carbon-based backbone. In another approach, the polymer may comprise PVDF, alone or in addition to an ionically conductive material, a polymer with anionic sulfonate groups substituted onto a carbon-based backbone, etc.

Of course, the second cathode may be formed of the same materials as the first cathode, or it may be formed of different materials. In addition, the thicknesses of the layers may be the same or different between the first and second cathodes.

In operation 612, a second solid-phase electrolyte material is applied above the second cathode to form a second electrode separation layer. Any method of application may be used, including, but not limited to, slurry coating with doctor blade to control thickness, sputter coating, CVD, PECVD, PVD, ion plating, electroplating, electroless plating, sol-gel deposition, spraying, dip-coating, etc.

According to one approach, the second solid-phase electrolyte material may comprise particles of inorganic solid-state lithium ion conductors dispersed in a polymeric binder. The binder may be an ion exchange polymer with high lithium mobility, another polymeric electrolyte material, etc. In a further approach, the ion exchange polymer may comprise a polymer with anionic sulfonate groups substituted onto a carbon-based backbone.

Of course, the second electrode separation layer may be formed of the same materials as the first electrode separation layer, or it may be formed of different materials. In addition, the thicknesses of the layers may be the same or different between the first and second electrode separation layers.

In operation 614, a second active anode material is applied above the second electrode separation layer to form a second anode. Any method of application may be used, including, but not limited to, slurry coating with doctor blade to control thickness, sputter coating, CVD, PECVD, PVD, ion plating, electroplating, electroless plating, sol-gel deposition, spraying, dip-coating, etc.

Of course, the second anode may be formed of the same materials as the first anode, or it may be formed of different materials. In addition, the thicknesses of the layers of the anodes may be the same or different between the first and second anodes.

In one approach, the second active anode material may comprise an ionically conductive polymer to facilitate lithium transport in interstitial spaces of the second anode. In addition, the ionically conductive polymer may comprise a polymer with anionic sulfonate groups substituted onto a carbon-based backbone. In another approach, the polymer may comprise PVDF, alone or in combination with an ionically conductive material, a polymer with anionic sulfonate groups substituted onto a carbon-based backbone, etc.

In operation 616, a second metal interconnect material is applied above the second anode. Any material suitable to be used as an interconnect may be used as would be known to one of skill in the art, such as aluminum, copper, silver, gold, etc. In one approach, the second metal interconnect coating section may comprise one or more metal foils. Any suitable metal foil as would be known to one of skill in the art may be used, such as metal foils capable of being used in a cell of a lithium ion battery, a copper foil, an aluminum foil, etc. depending upon the active material adjacent to those metals. Also, any method of application may be used, including, but not limited to, slurry coating with doctor blade to control thickness, sputter coating, CVD, PECVD, PVD, ion plating, electroplating, electroless plating, sol-gel deposition, spraying, dip-coating, etc.

In optional operation 618, calendaring and slitting operations may be performed on the multilayered bipolar cell, as would be known to one of skill in the art, thereby rendering the multilayered bipolar cell capable of being used in a battery configuration to produce and/or store energy.

In optional operation 620, a hermetic package coating section may be applied to the stack, as would be known to one of skill in the art, thereby hermetically sealing the multilayered bipolar cell. Of course, other coatings may be applied, with or without the hermetic package coating section to produce other desirable effects, such as static resistance, water resistance, etc., and to further protect the multilayered bipolar cell.

These coatings may be produced with novel high-speed multilayer coating machines, capable of sequentially depositing a cathode layer, a solid electrolyte layer, an anode layer, a conductive barrier layers, followed by additional layers of cathode, solid electrolyte, anode and metal barrier layers, thereby forming the bipolar stack.

According to one embodiment, a multi-functional multilayer coating process for fabrication of an entire cell on a single metal foil backing is provided. For example, in one variation, the active cathode material may first be applied to an aluminum foil or substrate, followed by application of a second coating that serves as a solid-phase electrolyte. After application of the electrolyte layer, the anode coating may be applied in one embodiment, along with an electrically conductive overcoat.

The coating for the cathode and anode layers are similar to those used in conventional lithium ion batteries, with the exception of the polymeric binder, which in addition to PVDF, can also include ionically conductive polymers to facilitate lithium transport in the interstitial spaces of the electrodes.

The separator layer is formed from particles of inorganic solid-state lithium ion conductors, in one embodiment, dispersed in a polymeric binder. In this case, the preferred binder is an ion exchange polymer, or a solid polymer electrolyte, with high lithium ion mobility, or another polymeric electrolyte material appropriate for a conventional lithium ion battery. The ion-conductive polymer may be a polymer with anionic sulfonate groups substituted onto a carbon-based backbone.

In one embodiment, a single multi-layer coating on a single foil backing substituted for two coated foils and a coated polyethylene separator dramatically reduces production costs. Once fabricated, the multi-layer multifunctional coating may be used with conventional packaging materials. The composite electrolyte layer has ion-conductive solid particles, which provide very high compressive strength for this layer (electrode separation layer), and helps prevent shorts and dendrite penetration, in some approaches. By using hard ion-conductive particles, the separator not only has compressive strength, but also high ion mobility.

In some embodiments, method 600 may be reversed, e.g., an anode material may be formed on a substrate to begin the stacking operations instead of an active cathode material being formed on a substrate. Similar materials, techniques, and approaches may be used in this embodiment as those discussed in regard to FIG. 6.

Figure 7:
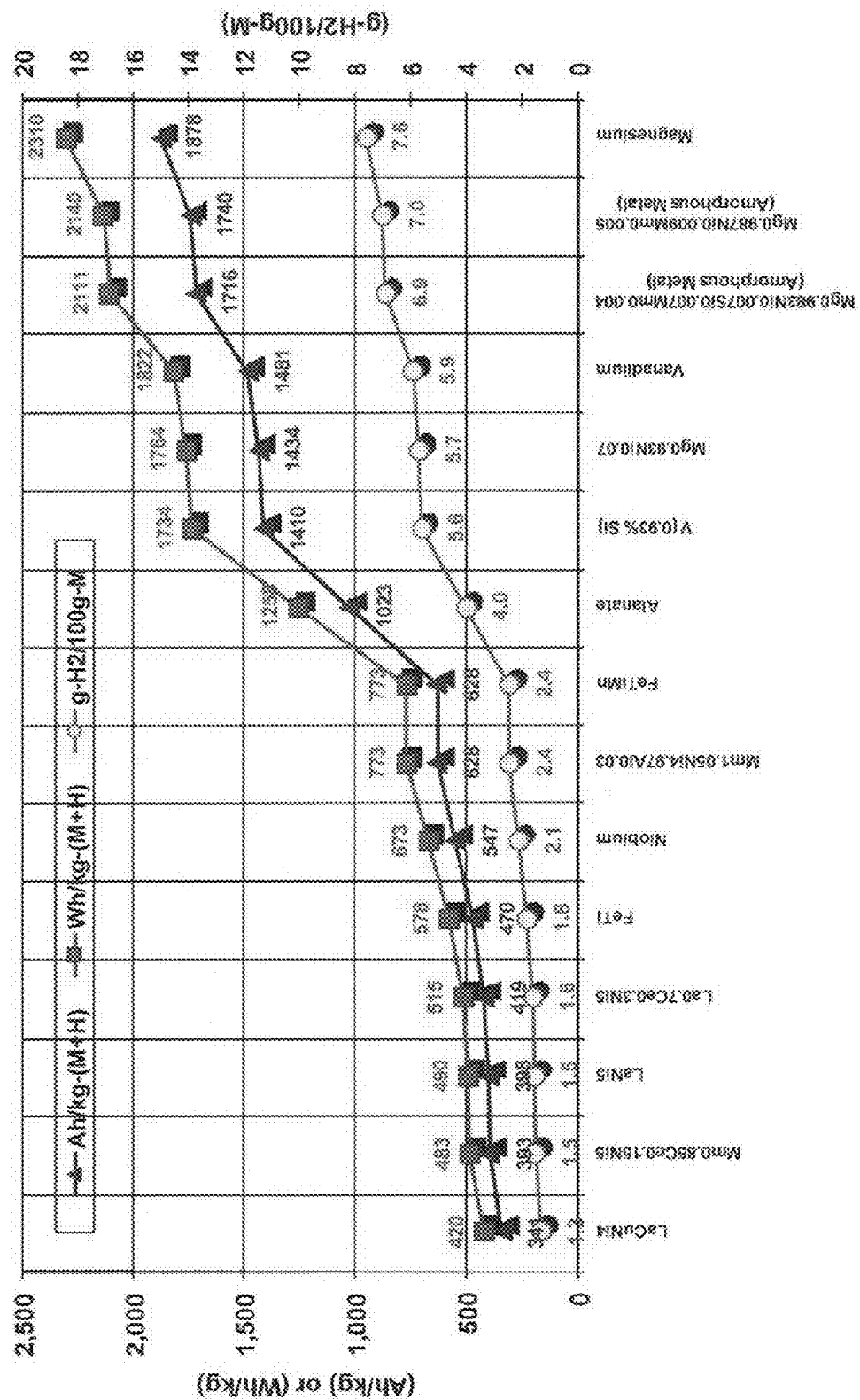
FIG. 7 shows a comparison of possible hydrides that can be used to form a hydride electrode in a NiMH-type system, according to some embodiments.

In addition to using this approach for the construction of lithium-based rechargeable and primary batteries, it may also be applied to other battery chemistries, such as the nickel metal hydride (NiMH) system. A wide variety of hydrides can be used, as illustrated in FIG. 7.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multi-layer bipolar coated cell formed on a single substrate, the cell comprising:
a first active anode material positioned above an electrically conductive substrate, wherein the first active anode material includes a plurality of discrete units, wherein the discrete units of the first active anode material are spatially separated from one another and dispersed throughout a bulk of a first anodic binder phase;
a first solid-phase electrolyte material positioned above the first active anode material, wherein the first solid-phase electrolyte material includes a plurality of discrete units, wherein the discrete units of the first solid-phase electrolyte material are spatially separated from one another and dispersed throughout a bulk of a binder phase between the first anodic binder phase and a first cathodic binder phase;
a first active cathode material positioned above the first solid-phase electrolyte material, wherein the first active cathode material includes a plurality of discrete units, wherein the discrete units of the first active cathode material are spatially separated from one another and dispersed throughout a bulk of the first cathodic binder phase;
an electrically conductive barrier layer;
a second active anode material positioned above the first active cathode material, wherein the second active anode material includes a plurality of discrete units wherein the discrete units of the second active anode material are spatially separated from one another and dispersed throughout a bulk of a second anodic binder phase;
a second solid-phase electrolyte material positioned above the second active anode material, wherein the second solid-phase electrolyte material includes a plurality of discrete units, wherein the discrete units of the second solid-phase electrolyte material are spatially separated from one another and dispersed throughout a bulk of a binder phase between the second anodic binder phase and a second cathodic binder phase;
a second active cathode material positioned above the second solid-phase electrolyte material, wherein the second active cathode material includes a plurality of discrete units, wherein the discrete units of the first active cathode material are spatially separated from one another and dispersed throughout a bulk of the second cathodic binder phase;
a conductive material positioned above the second active cathode material; and
a metal material above the second active anode material to form a metal coating section;
wherein a first ionically conductive polymer and a second ionically conductive polymer facilitate lithium transport in interstitial spaces of the first active anode material and the first active cathode material, respectively; and
wherein a third ionically conductive polymer and a fourth ionically conductive polymer facilitate lithium ion transport in the second active anode material and the second active cathode material, respectively.

2. A method for producing the multi-layer bipolar coated cell of claim 1, the method comprising:
dispersing the discrete units of the first active anode material throughout a first anodic binder phase material to form the first active anode material;
applying the first active anode material above the electrically conductive substrate to form a first anode, the first active anode material including the first ionically conductive polymer dispersed in the first anodic binder phase;
dispersing the discrete units of the first solid-phase electrolyte material throughout a binder phase material to form the first solid-phase electrolyte material;
applying the first solid-phase electrolyte material above the first anode to form a first electrode separation layer, wherein the first solid-phase electrolyte material is ionically-conductive;
dispersing the discrete units of the first active cathode material throughout a first cathodic binder phase material to form the first active cathode material;
applying the first active cathode material above the first electrode separation layer to form a first cathode, the first active cathode material including the second ionically conductive polymer dispersed in the first cathodic binder phase;
applying the electrically conductive barrier layer above the first cathode;
dispersing the discrete units of the second active anode material throughout a second anodic binder phase material to form the second active anode material;
applying the second active anode material above the first active cathode material to form a second anode, the second active anode material including the third ionically conductive polymer dispersed in the second anodic binder phase;
dispersing the discrete units of the second solid-phase electrolyte material throughout a binder phase material to form the second solid-phase electrolyte material;
applying the second solid-phase electrolyte material above the second anode to form a second electrode separation layer, wherein the second solid-phase electrolyte material is ionically conductive;
dispersing the discrete units of the second active cathode material throughout a second cathodic binder phase material to form the second active cathode material;
applying the second active cathode material above the second electrode separation layer to form a second cathode, the second active cathode material including the fourth ionically conductive polymer dispersed in the second cathodic binder phase; and
applying the conductive material above the second cathode to form a metal coating section, wherein the second conductive material comprises a metal material,
wherein the first ionically conductive polymer and the second ionically conductive polymer facilitate lithium transport in interstitial spaces of the first active anode material and the first active cathode material, respectively,
wherein the third ionically conductive polymer and the fourth ionically conductive polymer facilitate lithium transport in interstitial spaces of the second active anode material and the second active cathode material, respectively, where at least one of the cathodic binder phases and at least one of the anodic binder phases remains in the resulting multi-layer bipolar coated cell.

3. The method of claim 2, wherein at least one of the first, second, third and fourth ionically conductive polymers comprises a polymer with anionic sulfonate groups substituted onto a carbon-based backbone.

4. The method of claim 2, wherein the first cathodic binder phase and the second cathodic binder phase comprise polyvinylidene fluoride (PVDF).

5. The method of claim 2, wherein the first, second, third and fourth ionically conductive polymers comprise a polymer with anionic sulfonate groups substituted onto a carbon-based backbone.

6. The method of claim 2, wherein the first anodic binder material and the second anodic binder material comprise polyvinylidene fluoride (PVDF).

7. The method of claim 2, wherein the first solid-phase electrolyte material and the second solid-phase electrolyte material comprise particles of inorganic solid-state lithium ion conductors dispersed in a polymeric binder, the binder being an ion exchange polymer with high lithium mobility or a polymeric electrolyte material.

8. The method of claim 7, wherein the ion exchange polymer comprises a polymer with anionic sulfonate groups substituted onto a carbon-based backbone.

9. The method of claim 2, further comprising performing calendaring and slitting operations on the multi-layer bipolar coated cell.

10. The method of claim 2, further comprising applying a hermetic package coating section to hermetically seal the multi-layer bipolar coated cell.

11. The method of claim 2, wherein applying the electrically conductive barrier layer further comprises applying a metal interconnect material between the first anode and the second cathode to form a metal interconnect section.

12. The method of claim 11, wherein the substrate, the metal interconnect material, and the metal material comprise at least one metal foil chosen from a list consisting of: copper, aluminum, gold, silver, and composites thereof.

13. The method of claim 2, wherein at least one of the anode materials includes at a pure solid-phase element selected from a group consisting of Pb, Cd, Zn, Fe, Na, Ca, Mg, Al, Li, and alloys thereof.

14. The method of claim 2, wherein at least one of the anode materials includes a material selected from a group consisting of a hydride, a graphite, an intercalation compound of lithium, a lithium-silicon alloy, a lithium-tin alloy, and an intercalation compound or alloy of sodium.

15. The cell of claim 1, wherein at least one of the first, second, third and fourth ionically conductive polymers comprises a polymer with anionic sulfonate groups substituted onto a carbon-based backbone.

16. The cell of claim 1, wherein the first anodic binder phase and the second anodic binder phase comprise a polyvinylidene fluoride (PVDF).

17. The cell of claim 1, wherein the first and second solid-phase electrolyte materials comprise particles of inorganic solid-state lithium ion conductors dispersed in a polymeric binder, the binder being an ion exchange polymer with lithium mobility or a polymeric electrolyte material.

18. The cell of claim 17, wherein the ion exchange polymer comprises a polymer with anionic sulfonate groups substituted onto a carbon-based backbone.

19. The cell of claim 1, wherein the electrically conductive barrier layer comprises at least two metal layers, each metal layer independently chosen from a list consisting of: copper, aluminum, gold, silver, and composites thereof.

20. The cell of claim 1, wherein the substrate comprises at least one metal foil comprising silver, and composites thereof.

21. The cell of claim 1, further comprising a hermetic package coating section adjacent to the conductive material which hermetically seals the multi-layer bipolar coated cell.

22. The cell of claim 1, wherein at least one of the anode materials includes a pure solid-phase element selected from a group consisting of Pb, Cd, Zn, Fe, Na, Ca, Mg, and alloys thereof.

23. The cell of claim 1, wherein at least one of the anode materials includes a material selected from a group consisting of a hydride, a graphite, and an intercalation compound or alloy of sodium.

24. The cell of claim 1, wherein at least one of the anode materials includes a material selected from a group consisting of an intercalation compound of lithium, a lithium-silicon alloy, and a lithium-tin alloy.

25. The cell of claim 1, wherein the electrically conductive barrier layer comprises:
a polymer; and
a plurality of electrically conductive particles held in place by the polymer.

26. The cell of claim 25, wherein the polymer of the barrier layer is electrically conductive.

27. The cell of claim 1, wherein the first active cathode material and the second active cathode material are different.

28. The cell of claim 1, wherein the first active anode material and the second active anode material are different.

29. The cell of claim 1, wherein the first ionically conductive polymer and the third ionically conductive polymer are different.

30. The cell of claim 1, wherein the second ionically conductive polymer and the fourth ionically conductive polymer are different.

31. The cell of claim 1, wherein a thickness of the first active anode material is different from a thickness of the second active anode material.

32. The cell of claim 1, wherein a thickness of the first active cathode material is different from a thickness of the second active cathode material;
wherein at least one of the first active cathode material, the first active anode material, the second active cathode material, and the second active anode material comprises a polymer with anionic sulfonate groups substituted onto a carbon-based backbone;
wherein the first anodic binder phase and the second anodic binder phase comprise a polyvinylidene fluoride (PVDF);
wherein the first and second solid-phase electrolyte materials comprise particles of inorganic solid-state lithium ion conductors dispersed throughout a polymeric binder, the binder being an ion exchange polymer with lithium mobility or a polymeric electrolyte material;
wherein the ion exchange polymer comprises a polymer with anionic sulfonate groups substituted onto a carbon-based backbone;
wherein the substrate comprises silver;
wherein the electrically conductive barrier layer comprises:
a polymer; and
a plurality of electrically conductive particles held in place by the polymer;
wherein the polymer of the barrier layer is electrically conductive;
wherein the first active cathode material and the second active cathode material are different;
wherein the first active anode material and the second active anode material are different;

wherein at least one of the anode materials includes a material selected from a group consisting of an intercalation compound of lithium, a lithium-silicon alloy, a lithium-tin alloy, a hydride, a graphite, and an intercalation compound or alloy of sodium;

wherein the first ionically conductive polymer and the third ionically conductive polymer are different;

wherein the second ionically conductive polymer and the fourth ionically conductive polymer are different;

wherein a thickness of the first active anode material is different from a thickness of the second active anode material;

wherein at least one of the first solid-phase electrolyte materials and the second solid-phase electrolyte materials comprises a graded composite characterized by at least one gradient in composition; and wherein the at least one gradient includes:
  a first gradient between the substrate and the electrically conductive barrier layer, the first gradient being characterized by a higher concentration of transition metal oxides in a region adjacent the substrate relative to a concentration of transition metal oxide in a region adjacent the electrically conductive barrier layer;
  a second gradient between the substrate and the electrically conductive barrier layer, the second gradient being characterized by a higher concentration of graphitic particles in the region adjacent the electrically conductive barrier layer relative to a concentration of graphitic particles in the region adjacent the substrate; and
  a third gradient between the substrate and the electrically conductive barrier layer, the third gradient being characterized by a higher concentration of ion-conductive particles in a region located equidistant from the electrically conductive barrier layer and the substrate relative to a concentration of ion-conductive particles in regions immediately adjacent the electrically conductive barrier layer or the substrate.

33. The cell of claim 1, wherein at least one of the first solid-phase electrolyte materials and the second solid-phase electrolyte materials comprises a graded composite characterized by at least one gradient in composition, each gradient being defined between either the substrate and the electrically conductive barrier layer or between the electrically conductive barrier layer and the conductive material positioned above the second active cathode material; and
  wherein the at least one gradient in composition comprises either or both of:
    a transition from predominantly transition metal oxides to predominantly ion-conductive particles; and
    a transition from predominantly ion-conductive particles to predominantly graphitic particles.

34. The cell of claim 33, wherein the at least one gradient includes:
  a first gradient between the substrate and the electrically conductive barrier layer, the first gradient being characterized by a higher concentration of transition metal oxides in a region adjacent the substrate relative to a concentration of transition metal oxide in a region adjacent the electrically conductive barrier layer;
  a second gradient between the substrate and the electrically conductive barrier layer, the second gradient being characterized by a higher concentration of graphitic particles in the region adjacent the electrically conductive barrier layer relative to a concentration of graphitic particles in the region adjacent the substrate; and
  a third gradient between the substrate and the electrically conductive barrier layer, the third gradient being characterized by a higher concentration of ion-conductive particles in a region located equidistant from the electrically conductive barrier layer and the substrate relative to a concentration of ion-conductive particles in regions immediately adjacent the electrically conductive barrier layer or the substrate.

35. A multi-layer bipolar coated cell formed on a single substrate, the cell comprising:
  a first active anode material positioned above an electrically conductive substrate, wherein the first active anode material includes a plurality of discrete units, wherein the discrete units of the first active anode material are spatially separated from one another and dispersed throughout a bulk of a first anodic binder phase;
  a first solid-phase electrolyte material positioned above the first active anode material, wherein the first solid-phase electrolyte material includes a plurality of discrete units, wherein the discrete units of the first solid-phase electrolyte material are spatially separated from one another and dispersed throughout a bulk of a binder phase between the first anodic binder phase and a first cathodic binder phase;
  a first active cathode material positioned above the first solid-phase electrolyte material, wherein the first active cathode material includes a plurality of discrete units, wherein the discrete units of the first active cathode material are spatially separated from one another and dispersed throughout a bulk of a first cathodic binder phase;
  an electrically conductive barrier layer;
  a second active anode material positioned above the first active cathode material, wherein the second active anode material includes a plurality of discrete units, wherein the discrete units of the second active anode material are spatially separated from one another and dispersed throughout a bulk of a second anodic binder phase;
  a second solid-phase electrolyte material positioned above the second active anode material, wherein the second solid-phase electrolyte material includes a plurality of discrete units, wherein the discrete units of the second solid-phase electrolyte material are spatially separated from one another and dispersed throughout a bulk of a binder phase between the second anodic binder phase and a second cathodic binder phase;
  a second active cathode material positioned above the second solid-phase electrolyte material, wherein the second active cathode material includes a plurality of discrete units, wherein the discrete units of the first active cathode material are spatially separated from one another and dispersed throughout a bulk of a second cathodic binder phase; and
  a conductive material positioned above the second active cathode material,
  wherein at least one of the first solid-phase electrolyte materials and the second solid-phase electrolyte materials comprises a graded composite, the graded composite including:
    a first gradient between the substrate and the electrically conductive barrier layer, the first gradient being characterized by a higher concentration of transition metal oxides in a region adjacent the substrate relative to a concentration of transition metal oxide in a region adjacent the electrically conductive barrier layer;

a second gradient between the substrate and the electrically conductive barrier layer, the second gradient being characterized by a higher concentration of graphitic particles in the region adjacent the electrically conductive barrier layer relative to a concentration of graphitic particles in the region adjacent the substrate; and a third gradient between the substrate and the electrically conductive barrier layer, the third gradient being characterized by a higher concentration of ion-conductive particles in a region located equidistant from the electrically conductive barrier layer and the substrate relative to a concentration of ion-conductive particles in regions immediately adjacent the electrically conductive barrier layer or the substrate.

36. A coated cell formed on a single substrate, the cell comprising:

an active cathode material positioned above an electrically conductive substrate, wherein the active cathode material includes a plurality of discrete units, wherein the discrete units of the active cathode material are spatially separated from one another and dispersed throughout a bulk of a cathodic binder phase;

a solid-phase electrolyte material positioned above the active cathode material, wherein the solid-phase electrolyte material includes a plurality of discrete units, wherein the discrete units of the solid-phase electrolyte material are spatially separated from one another and dispersed throughout a bulk of a binder phase between the cathodic binder phase and an anodic binder phase;

an active anode material positioned above the solid-phase electrolyte material, wherein the active anode material includes a plurality of discrete units, wherein the discrete units of the active anode material are spatially separated from one another and dispersed throughout a bulk of the anodic binder phase; and a conductive overcoat material positioned above the active anode material.

* * * * *